(12) United States Patent
Amizur et al.

(10) Patent No.: US 9,599,698 B2
(45) Date of Patent: Mar. 21, 2017

(54) ENHANCED POSITIONING SYSTEM USING HYBRID FILTER

(71) Applicant: Intel Corporation, Santa Clara, CA (US)

(72) Inventors: Yuval Amizur, Kfar-Saba (IL); Uri Schatzberg, Kiryat Ono (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/752,520

(22) Filed: Jun. 26, 2015

(65) Prior Publication Data

US 2016/0154083 A1 Jun. 2, 2016

Related U.S. Application Data

(60) Provisional application No. 62/086,390, filed on Dec. 2, 2014.

(51) Int. Cl.
*H04W 24/00* (2009.01)
*G01S 5/02* (2010.01)
*H04W 4/02* (2009.01)

(52) U.S. Cl.
CPC ........... *G01S 5/0278* (2013.01); *H04W 4/023* (2013.01); *H04W 4/028* (2013.01)

(58) Field of Classification Search
CPC .... H04W 64/00; H04W 4/02; H04L 29/08657
USPC ............ 455/456.1, 404.2, 414.1, 414.2
See application file for complete search history.

(56) References Cited

U.S. PATENT DOCUMENTS

| 2013/0053056 A1* | 2/2013 | Aggarwal | G01S 5/0263 455/456.1 |
|---|---|---|---|
| 2013/0336138 A1 | 12/2013 | Venkatraman et al. | |
| 2015/0350849 A1* | 12/2015 | Huang | H04W 4/04 455/456.1 |

(Continued)

OTHER PUBLICATIONS

Extended European Search Report received for European Patent Application No. 15191990.9, mailed on May 6, 2016, 7 pages.

(Continued)

*Primary Examiner* — Nghi H Ly
(74) *Attorney, Agent, or Firm* — SLGIP

(57) ABSTRACT

The disclosure generally relates to an enhanced positioning system and method using a combination or hybrid filter. In one embodiment, Time-Of-Flight (ToF) measurements are used to determine an approximate location for a mobile device in relationship to one or more Access Points. The ToF combined with known and unknown variables are then processed through a hybrid filter system to determine location of the mobile device. The hybrid filter system may include a Kalman Filter (KF) for processing linear models and generally Gaussian noise distribution. The KF assumes that the state probability of mobile device location is Gaussian. Such variables include, for example, WiFi ToF bias. The hybrid filter system may include a Bayesian Filter (BF) for processing variables having non-Gaussian noise distribution and non-linear models. Such variables include, for example, the coordinates of the mobile device. A probability determination from each of the KF and BF is then applied to estimate the mobile device location.

16 Claims, 6 Drawing Sheets

(56) References Cited

U.S. PATENT DOCUMENTS

2016/0192157 A1* 6/2016 Wirola .................. G01S 5/0252
455/456.1

OTHER PUBLICATIONS

Hejc et al., "Seamless Indoor Outdoor Positioning using Bayesian Sensor Data Fusion on Mobile and Embedded Devices", Proceedings of the 26th International Technical Meeting of the ION Satellite Division, Fraunhofer Institute for Integrated Circuits IIS, Sep. 16-20, 2013, pp. 1252-1259.

Tsai et al., "The Development of an Indoor Location Based Service Test Bed", 22nd International Meeting of the Satellite Division of the Institute of Navigation, Department of Aeronautics and Astronautics, Sep. 22-25, 2009, pp. 1025-1033.

* cited by examiner

ENHANCED POSITIONING SYSTEM USING HYBRID FILTER

The instant disclose claims priority to U.S. Provisional Application No. 62/086,390 filed Dec. 2, 2014, the disclosure of which is incorporated herein in its entirety.

BACKGROUND

Field

The disclosure relates to a method, apparatus and system to apply a combination of probability techniques to provide an enhanced algorithm for probabilistic determinations. Specifically, the disclosure relates to a logic which may be implemented on one or more processors for applying hybrid filtering to signal data. When applied, the logic determines a mobile device location accurately.

Description of Related Art

Outdoor navigation is widely deployed due to advancement in various global positioning systems (GPS). There has been an increased focus on indoor navigation and position location. Indoor navigation differs from the navigation because the indoor environment precludes receiving GPS satellite signals. As a result, effort is now directed to solving the indoor navigation problem. This problem does not have a scalable solution with satisfactory precision.

A solution to indoor navigation may be based on the Time-of-Flight (ToF) method. ToF is defined as the overall time a signal propagates from the user to an access point (AP) and back to the user. This value can be converted into distance by dividing the signal's roundtrip travel time by two and multiplying it by the speed of light. This method is robust and scalable but requires significant hardware changes to the Wi-Fi modem and other devices. The ToF range calculation depends on determining the precise signal receive/transmit times. As little as 3 nanoseconds of discrepancy will result in about 1 meter of range error.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
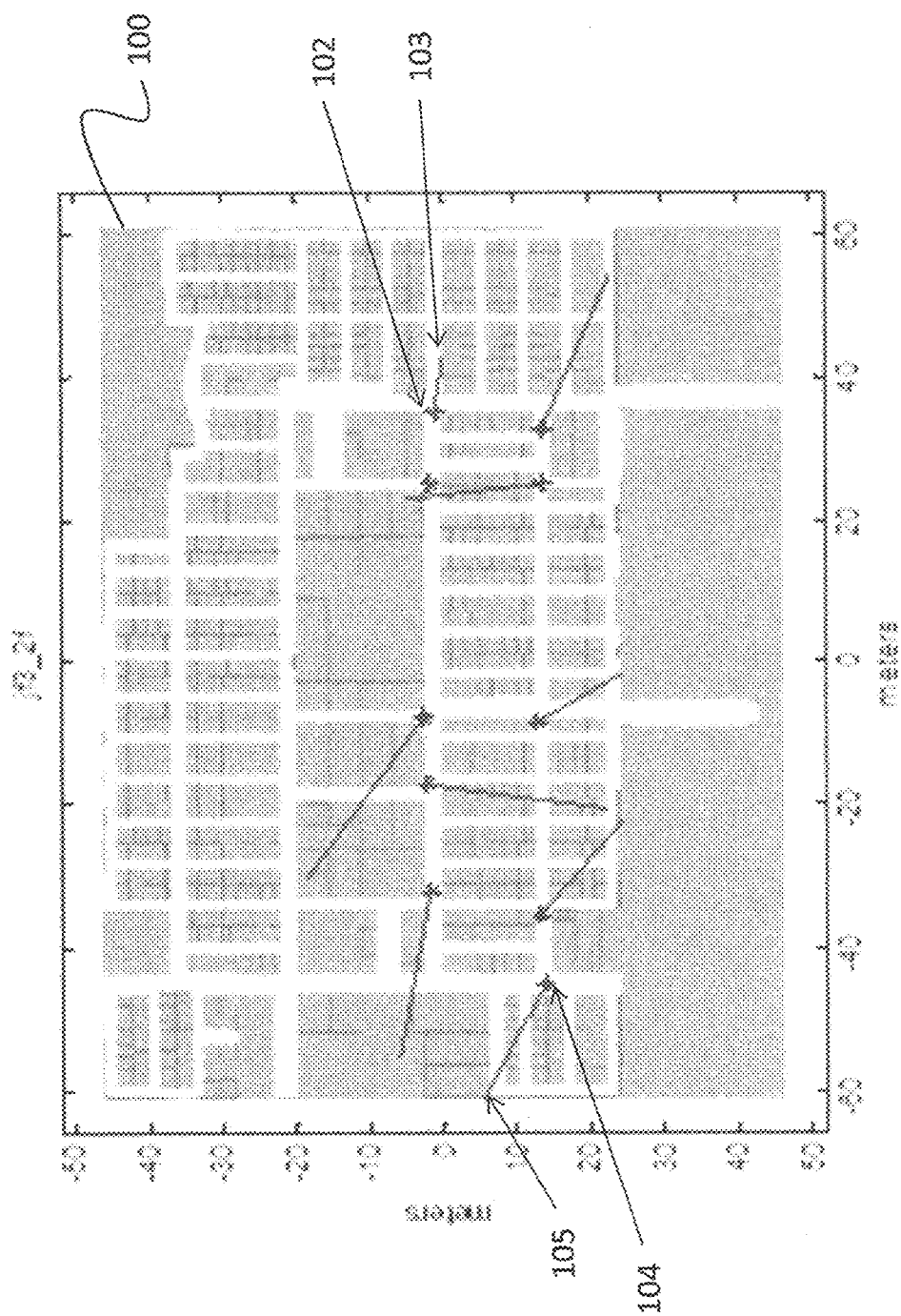
FIG. 1 shows fingerprint location errors for ten random locations in an exemplary environment.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12 TGac Channel Model Addendum Document"); IEEE 802.11 task group ad (TGad) (IEEE 802.1 1ad-2012, IEEE Standard for Information Technology and brought to market under the WiGig brand Telecommunications and Information Exchange Between Systems Local and Metropolitan Area Networks Specific Requirements Part 11: Wireless LAN Medium Access Control (MAC) and Physical Layer (PHY) Specifications Amendment 3: Enhancements for Very High Throughput in the 60 GHz Band, 28 Dec., 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HD™ specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves (http://en.wikipedia.org/wiki/Radio_waves) in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Outdoor navigation has been widely deployed due to the development of various systems including: global-navigation-satellite-systems (GNSS), Global Positioning System (GPS), Global Navigation Satellite System (GLONASS) and GALILEO (an outdoor GNSS developed by the European Union). Indoor navigation has been receiving considerable attention. Indoor navigation differs from the outdoor navigation since the indoor environment is not capable of receiving signals from GPS/GNSS satellites. As a result, Conventional techniques do not offer a scalable solution with acceptable precision.

In one embodiment of the disclosure, the ToF method is used to address indoor navigation. As discussed above, ToF is defined as the overall time a signal propagates from the user to an AP and back to the user. This ToF value can be converted into distance by dividing the time by two and multiplying it by the speed of light. The ToF method is robust and scalable but requires hardware changes to the existing Wi-Fi modems.

Estimating a state based on all previous measurements and system model is a common problem found in many fields of research and development. While the examples and implementations provided herein are directed to indoor navigation, the disclosed embodiments apply equally to other fields and probabilistic determinations. In one embodiment, the disclosed principles may be implemented in location determination products.

By way of example, a current location (x, y) and ToF bias for a mobile device may be estimated using WiFi Time-of-Flight (ToF) previous measurements (e.g., WiFi ToF ranges) while considering movement of the mobile device since the previous measurement. In this exemplary embodiment, the estimate is not of a single position fix location, rather it takes into account all past information including past estimation of states (e.g., positions). A solution to this problem typically has two phases. The first is the prediction (predict) phase and the second is the updating (update) phase. In the predict phase, the solution tries to predict how the position may have changed based on motion models. In the update phase, the new location probabilities are updated with added information from additional measurements (e.g., ToF range).

The conventional approaches deal with models which are linear and Gaussian in measurement and model. However, such range measurements are non-linear and non-Gaussian in both measurement and in modeling. Thus, in one embodiment of the disclosure a non-Gaussian distribution is assumed.

FIG. 1 shows fingerprint location errors for ten random locations in an exemplary environment. Specifically, FIG. 1 shows indoor environment 100 having ten randomly selected locations. The locations are randomly selected throughout an area. The area can be subdivided into multiple cells (not shown) such that one or more of the locations fall within one cell. Here, a Wi-Fi fingerprint database (not shown) was generated using an offline device. From a manual calibration it was determined that the online device had about −9 dB RSSI offset from the offline device. However, the online device was not calibrated for this test. When the online device was used at the 10 randomly selected test points (locations marked x) a significant location error was observed. For example, the online device identified location 103 as the online device location when it was actually at location 102 (an error of about 8 meters). Similarly, location 105 was identified as the online device location when it was actually at location 104 (an error of about 15 meters). Similar error was found for the remaining 8 random locations in FIG. 1. It can be readily seen that if the online device is not calibrated appropriately, the determined location can be as far as a few meters off at any direction.

Figure 2:
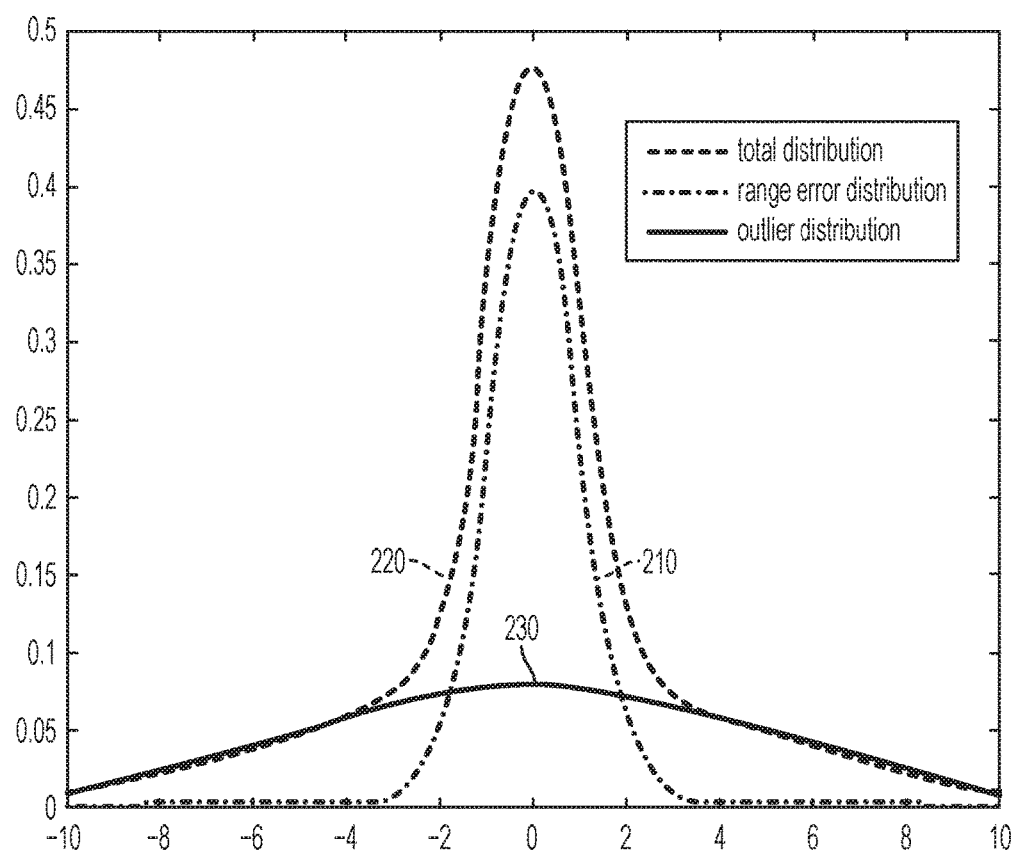
FIG. 2 schematically shows the non-Gaussian distribution of measurement error in an exemplary location determination.

FIG. 2 schematically shows the non-Gaussian distribution of measurement error in an exemplary location determination. The ToF range errors are composed of two phenomena. The first is the ToF range error (shown as curve 210) and the second is the outlier error (shown as curve 230). An outlier is a range measurement that is significantly different from the expected range. Outliers typically occur when the Line-of-Sight (LoS) path is blocked by an object. Such objects may be metallic objects. The distribution of ToF ranges are more accurately described by a non-Gaussian distribution as shown by curve 220 in FIG. 2. This distribution is the weighted sum of the two distributions. As shown in FIG. 2, there are two location determinations based on ToF data: one is a Gaussian around the true range with low variance (representing error) and another is the Gaussian around the true range with very large variance. The distribution is clearly non-Gaussian.

The disclosed embodiments also consider the measurement model as non-linear. For example, the ToF range measurement is provided in Equation (1):

$$\text{range} = \sqrt{(x_n - x_{AP})^2 + (y_n - y_{AP})^2 + (z - z_{AP})^2} + b_n + \text{noise} \quad (1)$$

Where $x_{ap}$, $y_{ap}$ and $z_{ap}$ are the APs point coordinates; $x_n$, $y_n$ and $z_n$ are the current position of the mobile device and $b_n$ is the ToF bias. As seen from Equation (1), the ToF measurement is non-linear.

It is clear that position determination is non-Gaussian and multi-modal. This is particularly true when the mobile device (interchangeably, navigating unit) is moving about or near an AP. In this situation, it will not be clear to the location determination system (or filter) on which side of the AP the navigating unit is located. There may be two or more possibilities and each must be maintained until the unit moves away from the AP and the ambiguity is resolved. Once the ambiguity is removed, the filter may destroy the redundant position and maintain the correct position.

Figure 3:
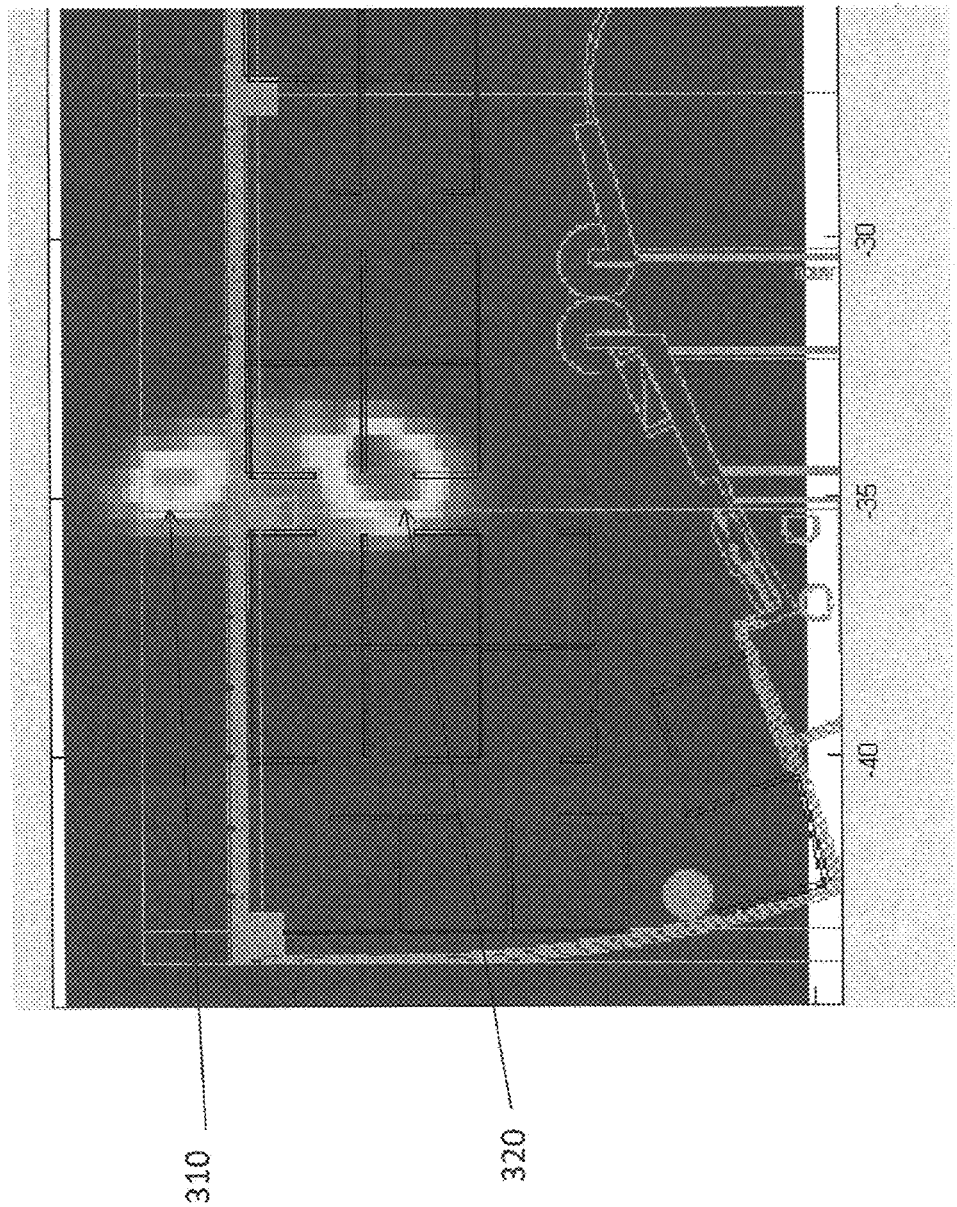
FIG. 3 is an exemplary distribution map showing an actual location and an erroneous location for a mobile device.

FIG. 3 is an exemplary distribution map showing an actual and an erroneous location for a mobile device. In the distribution map of FIG. 3, the red color regions 310, 320 show areas where the presence of the mobile device has a relatively high probability. As seen in FIG. 3, there are two possible locations for the mobile device. First location 310, is outside the building and the second location 320 is inside the building. Accordingly, there is a need for a system and method to filter possible locations for a mobile device to determine the correct device location.

In certain embodiments of the disclosure, a combination of Bayesian filter (BF) and Kalman filter (KF) techniques is used to estimate an accurate position for a mobile device. Each of Kalman and Bayesian models has advantages and disadvantages. In an exemplary application, a hybrid model is applied to filtering location data by using the advantageous features of each technique. The hybrid filter is applied to the ToF measurements to estimate new location and bias for the mobile device.

For example, while KF is simple and efficient, it only applies to Gaussian errors and linear models. KF model also assumes that the state probability is always Gaussian. There are other conventional KF implementations for non-linear models but these models also suffer from linearization problems. The BF model is accurate and is suitable for any error distribution. The BF technique can handle non-linear model and is capable of accounting for any state distribution. However, the BF technique demands high complexity and requires significantly higher processing power.

In one embodiment of the disclosure, the BF filtering method is used for states having non-linear models and non-Gaussian noise distributions and the KF technique is used for other states that have Gaussian noise and linear models (given the non-linear states). In an exemplary implementation according to one embodiment of the disclosure, a filter is assumed to have the following states: X-position (x coordinate); Y-position (y coordinate) and b as the WiFi ToF bias. In this example, BF technique is applied to X and Y states wand KF technique is applied to calculating the b state.

Conventional applications use KF exclusively for solving the exemplary problem. The application of KF has several drawbacks. First, KF does not account for outliers since KF works only with Gaussian distributions. Second, KF applies to linear models. The ToF range measurements are non-linear. Thus, applying KF results in inaccurate predictions when the measurement model is non-linear. Third, KF does not deal with position ambiguity issues described above. KF is predicated on the assumption that the solution is a Gaussian distribution. This means that KF is suitable for uni-modal (singe peak) distributions.

However, the range errors are not Gaussian. The measurement model is also non-linear and the position distribution may not be Gaussian distributed (i.e., the position distribution may be a multi-modal distribution). Another conventional method to address KF's deficiencies is to use a particle filter. Particle filters are, however, computationally intensive and are difficult to implement. The computational complexity of particle filters grows exponentially as the number of states increases. Consequently, particle filters are conventionally used for low dimensionality problems.

Certain embodiments of the disclosure are directed to a method to separate a state vector into two sub vectors. One vector is estimated using KF and the other vector is estimated using a BF. The disclosed embodiments enable using all measurements and states while considering whether the state will compute better through a Gaussian or non-Gaussian model. The disclosed embodiments consider that all states are interconnected through measurements and system model and thereby provide the advantages of both KF and BF without their disadvantages. Here, the states are the location and bias.

By way of example, an embodiment of the disclosure is applied to WiFi ToF measurement where the state vectors of Equation (2) are to be estimated:

$$\begin{pmatrix} x \\ y \\ b \end{pmatrix} \quad (2)$$

Figure 4:
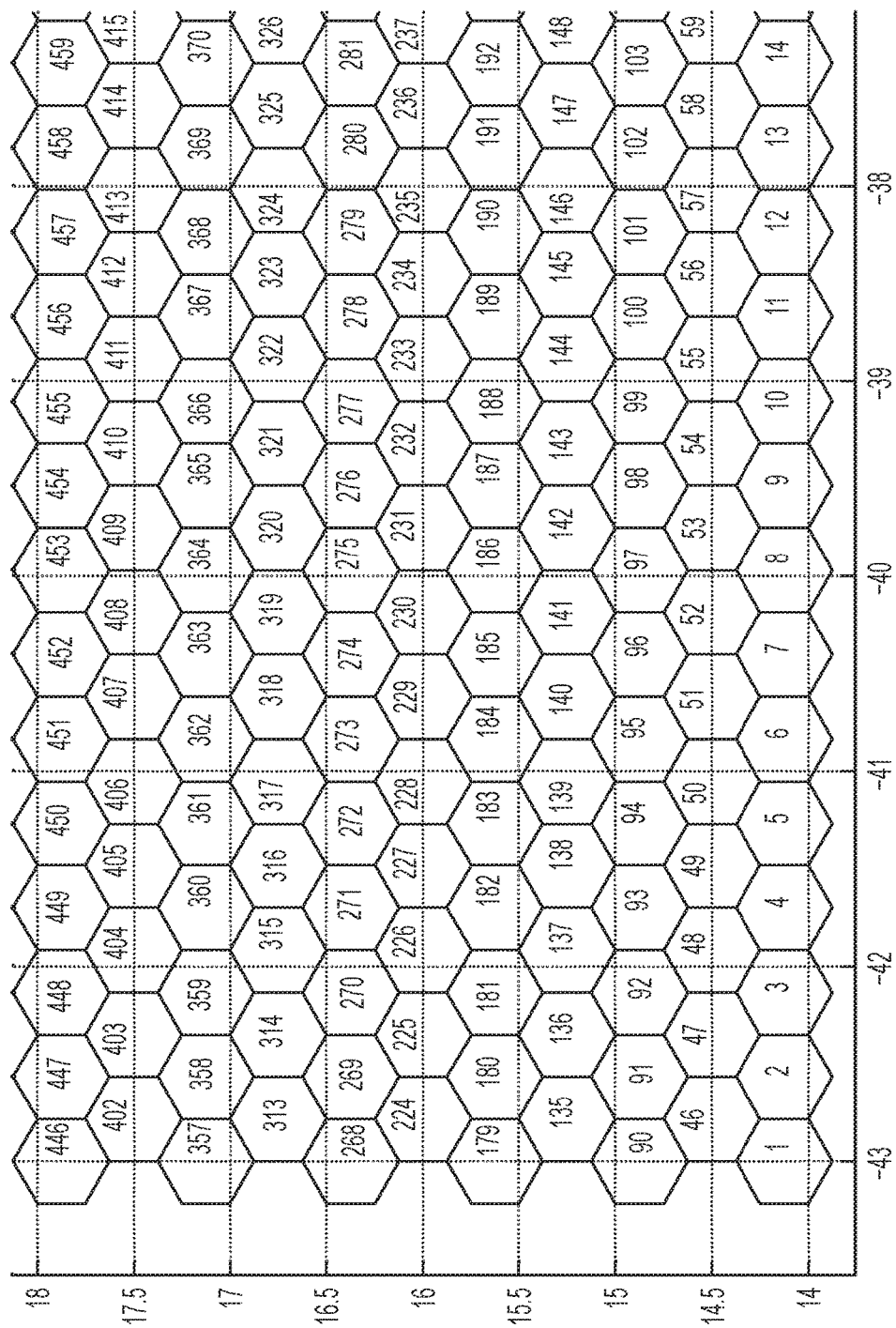
FIG. 4 shows a hexagonal grid for quantizing location of a mobile device.

In Equation (2), X denotes the x-position coordinate; Y denotes the y-position coordinate and b denotes the WiFi device bias. It is assumed that Z which denotes the z-position coordinate is approximately constant since the mobile device is unlikely to gain appreciable altitude gain. In one implementation, BF is used on state variables X and Y, while KF is used on state variable b. Next, the x-y coordinate plane may be quantized using hexagonal grids having, for example, 0.5 m depth. One such grid is shown at FIG. 4, where the hexagonal cells are numbered from left to right and bottom to top as cell nos. 1-459.

The system equations describing the relationship between the variables are provided as Equations (3) and (4) as follows:

$$x_{n+1} = B \cdot x_n + \sigma_w \cdot \sqrt{\Delta t} \cdot w_n \quad (3)$$

$$b_{n+1} = A(x_n) \cdot b_n + \sigma_v \cdot \sqrt{\Delta t} \cdot v_n \quad (4)$$

In Equations (3) and (4), w and v are both system noises, X is the [x, y] vector and b is the WiFi bias. B is a constant matrix. The measurement equation is shown as Equation (5):

$$y_n = \sqrt{(x_n - x_{AP})^2 + (y_n - y_{AP})^2 + (z - z_{AP})^2} + b_n + \sigma_v \cdot \sqrt{\Delta t} \cdot u_n \quad (5)$$

In Equation (5), y is the range measurement, u is the measurement noise, n denotes the current time, $\Delta t$ denotes the time period since the last measurement, u is the noise component, $\sigma_v$ is the variance of the noise and AP denotes the access point. An exemplary process includes initialization, prediction and update steps.

Initialization—The initialization states may be defined as the initial distribution for the mobile device to be at each hexagon cell of FIG. 4 with probability $Pr(x_n|y_{n-1})$ and initialize a 1 state (WiFi bias) KF for each hexagon. Each hexagon has a KF with 1 state (bias). This gives the bias an initial value for each hexagon.

Prediction—In one embodiment, the BF is predicted first. To predict the probability of location at a particular hexagonal cell $x_n$, all the neighboring cells $(x_{n-1})$ are first identified. Next, for each hexagon cell identify all neighbors $(x_{n-1})$, and multiply the probability to be at that neighbor $(x_{n-1})$ given all previous measurements $(Pr(x_{n-1}|y_{1:n-1}))$ with the transition probability from the neighbor to the hexagon $(Pr(x_n|x_{n-1}))$. It is noted that $Pr(x_n|x_{n-1})$ is calculated from the system model equation 3. It is effected by the distance between two hexagons. The bigger the distance the lower the probability.

The probability for all neighbors of a specific hexagonal cell are then summed to determine the new probability of the specific cell $(x_n)$ as Equation (6):

$$Pr(x_n | y_{1:n-1}) = \sum_{x_{n-1}} Pr(x_n | x_{n-1}) \cdot Pr(x_{n-1} | y_{1:n-1}) \quad (6)$$

The KF probability may be predicted next. For a specific cell $(x_n)$ perform conventional KF prediction with the assumption that the position is the cell location. This prediction is then repeated for all other cells to obtain a new (and updated) mean $(\eta_n)$ and variance $(\sigma_n^2)$ for each KF. For a specific cell we consider all neighboring cells and calculate the following weights:

$$p_n = \frac{Pr(x_n | x_{n-1}) \cdot Pr(x_{n-1} | y_{1:n-1})}{\sum_{x_{n-1}} Pr(x_n | x_{n-1}) \cdot Pr(x_{n-1} | y_{1:n-1})} \quad (7)$$

Next, use these weights to calculate new mean ($\eta$) and variance ($\sigma^2$) for the KF for every cell:

$$\eta = \sum_n p_n \cdot \eta_n \qquad (8)$$

$$\sigma^2 = \sum_n p_n \cdot (\sigma_n^2 + \eta_n^2) - \eta^2 \qquad (9)$$

Next, the BF value is updated by calculating the likelihood function ($Pr(y_n|x_n,\hat{b}_n^-)$) given that the bias is correct; the result is multiplied by the predicted probability ($Pr(x_n|y_{1:n-1})$) as shown in Equation (10):

$$Pr(x_n|y_{1:n}) = Pr(y_n|x_n,\hat{b}_n^-) \cdot Pr(x_n|y_{1:n-1}) \qquad (10)$$

The KF value is updated by performing an update for each cell assuming that the mobile device is located in that cell.

In one embodiment of the disclosure, the hybrid filter is used to determine location of a mobile device. The hybrid filter may use a combination of a Kalman and Bayesian filters to estimate location of the mobile device. In certain embodiments, the filters are interconnected and may run in parallel or sequentially. In one embodiment of the disclosure, different vector variables are directed to different filters for processing. For example, vector variables associated with linear or Gaussian behavior may be directed to a Kalman filter processor while non-linear or non-Gaussian variables are directed to a Bayesian filter processors.

Figure 5:
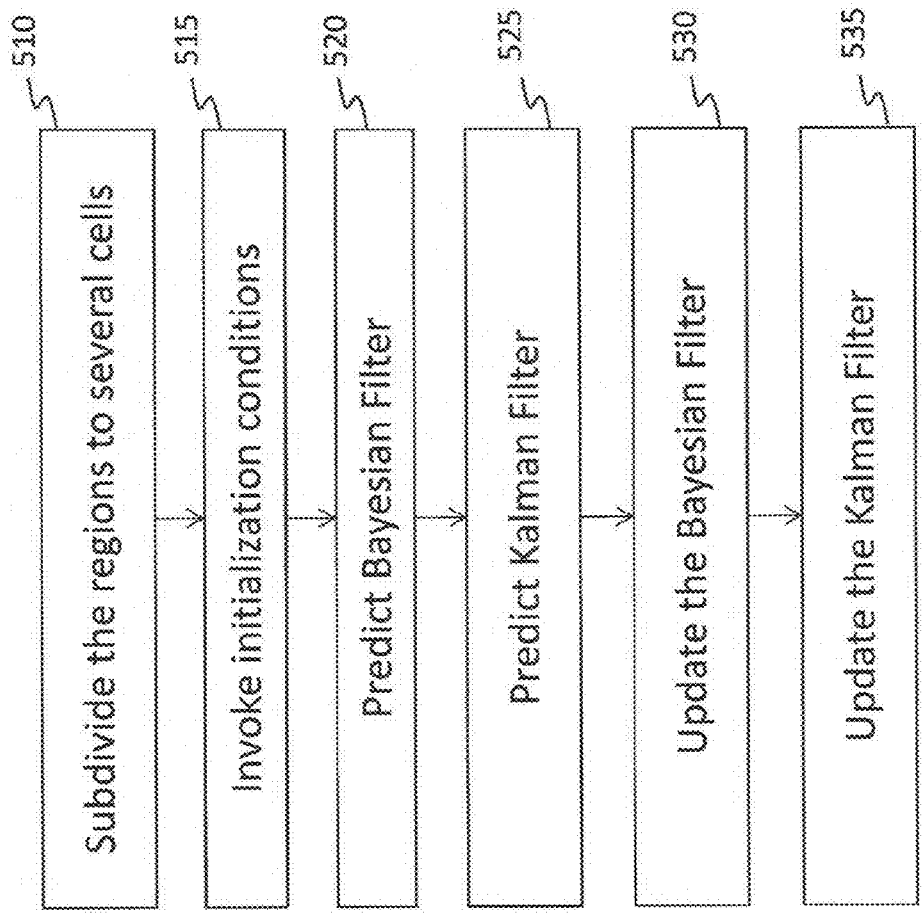
FIG. 5 shows an exemplary flow diagram for implementing an embodiment of the disclosure.

FIG. 5, shows an exemplary flow diagram for implementing an embodiment of the disclosure. The process begins at step 510 by breaking the location under study to a plurality of hypothetical cells. Each cell may be a hexagonal cell having substantially the same size as other cells in the location. Next, an initial distribution is assumed for each cell as the probability that the mobile device is located at a given cell as shown in Equation (11):

$$Pr(x_n|y_{1:n}) \qquad (11)$$

A first state (state 1) may be initialized as the KF bias for each cell (e.g., b=1). At step 520, the BF is predicted. In one embodiment, the BF is predicted mathematically according to Equation (6). Other predictive models may equally be used without departing from the disclosed embodiments. At step 525, the KF is predicted using Equation 7 or other mathematical models. In predicting the KF filter, it is assumed that the mobile device is located at the same place as the cell. Step 525 includes updating mean ($\eta_n$) and variance ($\sigma_n^2$) for each cell's KF value according to Equations (8) and (9).

At step 530, the BF may be updated for each cell as a likelihood function of Equation (10). Finally, at step 535, the KF filter may be updated for each cell with the assumption that the mobile device is located at the location of the cell. Each of steps 530 and 535 may be repeated recursively for each cell. The BF and KF updates use the ToF Range.

The exemplary steps show in the flow diagram of FIG. 5 may be implement in software, hardware or a combination of software and hardware. In one embodiment, the steps of FIG. 5 are implemented as logic on hardware having one or more processor circuitries.

Figure 6:
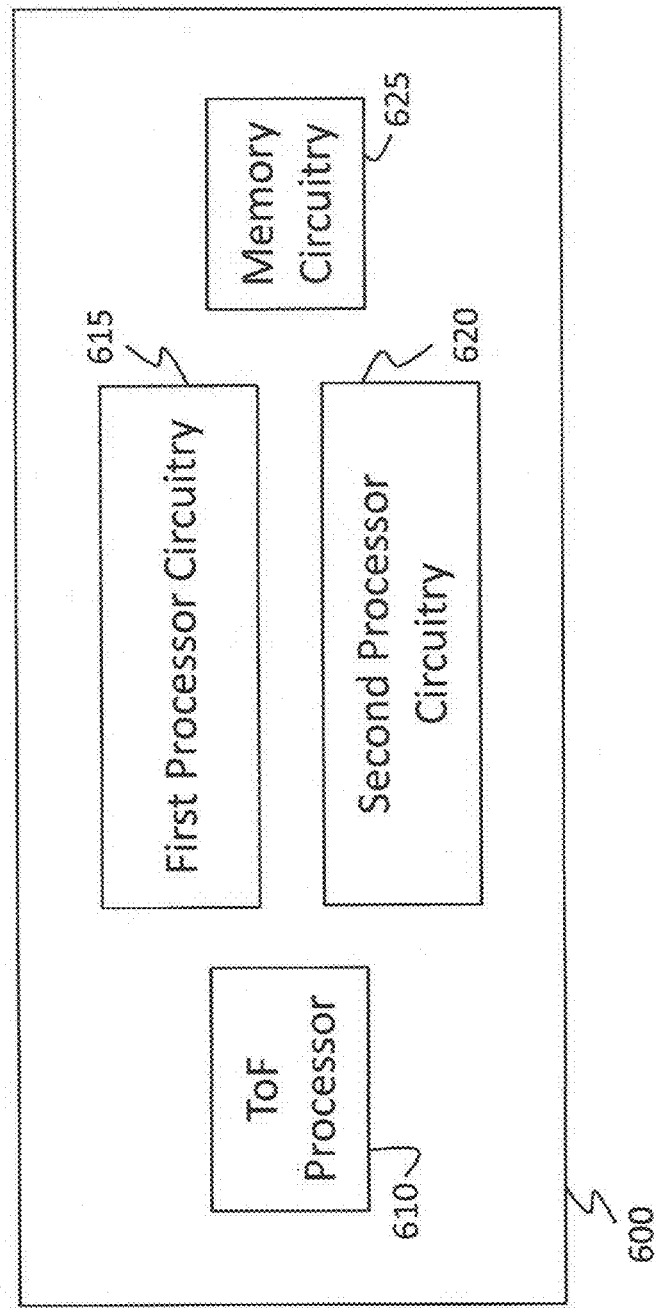
FIG. 6 is an exemplary apparatus according to one embodiment of the disclosure.

FIG. 6 is an exemplary apparatus according to one embodiment of the disclosure. Apparatus 600 of FIG. 6 may be implemented at hardware, software or a combination of hardware and software. In one embodiment, the apparatus is implemented on existing hardware associated with a mobile device. In another embodiment, the apparatus is implemented at a chipset having circuitries configured as shown in FIG. 6. While not shown, apparatus 600 may communicate with a front-end radio(s) and antennas configured to support different communication platforms (e.g., WiFi, cellular, BT and BLE).

ToF processor circuitry 610 of FIG. 6 may comprise processor circuitry to determine round-trip signal travel measurement to approximate distance to one or more APs. First processor circuitry 612 may communicate with ToF processor 610 to selectively identify and process a first group of state variables defining a Gaussian distribution. The first group of variables may define linear models. Such variables may include, for example, x and y coordinates of the mobile device estimated as a function of the ToF measurements and the AP's known location. First processor circuitry 615 may be configured to conduct Kalman filter analysis on the first group of variables.

Second processor circuitry may communicate with ToF processor 610 and First Processor 615 to selectively identify and process a second group of state variables defining a non-Gaussian and/or non-linear distribution. Such variables may include, for example, WiFi ToF bias. Second processor 620 circuitry may be configured to conduct Bayesian filter analysis on the second group of variables.

Memory circuitry 625 may communicate with each of ToF processor 610, First Processor Circuitry 615 and Second Processor Circuitry 620. Memory circuit may include instructions for each of the processor circuitries to carry out instructions for determining location of a mobile device subject to known and unknown variables. In one embodiment of the disclosure, memory circuitry 625 includes instructions similar to those shown in relation to FIG. 5.

In one embodiment of the disclosure first processor circuitry 615 communicates with second processor circuitry 620. Second processor circuitry 620 receives probability determinations from first processor circuitry, combines the received information with its own probabilistic determination and communicates an estimate for the mobile device location. In one embodiment, the filters update range measurements (thereby determining mobile device location) taking into account the error probability based on the variables.

The location information may be similarly determined by first processor circuitry 615. The location information may be communicated to the mobile device or user or it may be stored for future applications.

The following shows an exemplary mathematical derivation of an embodiment of the logic applied herein. In one implementation the derivation begins with the following system models:

$$x_{n+1} = B \cdot x_n + \sigma_w \cdot \sqrt{\Delta t} \cdot w_n \qquad (12)$$

$$z_{n+1} = A(x_n) \cdot z_n + \sigma_v \cdot \sqrt{\Delta t} \cdot v_n \qquad (13)$$

The measurement model may be defined as follows:

$$y_n = h(x_n, z_n) + \sigma_u \cdot u_n \qquad (14)$$

Equation (15) describes the general formulation for determining probability of a mobile device being a given cell location.

$$Pr(x_n, z_n | y_{1:n}) = \frac{Pr(y_n | x_n, z_n) \cdot Pr(z_n, x_n | y_{1:n-1})}{Pr(y_n | y_{1:n-1})} \qquad (15)$$

The denominator of Equation (15) may be removed since it has substantially no effect on optimization and the equation may be rewritten as follows:

$$Pr(x_n, z_n | y_{1:n}) = Pr(y_n | x_n, z_n) \cdot Pr(z_n, x_n | y_{1:n-1}) \quad (16)$$

In Equation (16), the Base (B) (which denotes the Bayes rule) may be used and the equation rearranged to:

$$Pr(x_n, z_n | y_{1:n}) = Pr(x_n | y_{1:n-1}) \cdot Pr(y_n | x_n, z_n) \cdot Pr(z_n | x_n, y_{1:n-1}) \quad (17)$$

$$Pr(x_n, z_n | y_{1:n}) = Pr(x_n | y_{1:n-1}) \cdot Pr(y_n | x_n, z_n) \cdot Pr(z_n | x_n, y_{1:n-1}) \quad (18)$$

$$Pr(x_n, z_n | y_{1:n}) = \quad (19)$$

$$Pr(x_n | y_{1:n-1}) \cdot Pr(y_n | x_n, z_n) \cdot Pr(z_n | x_n, y_{1:n-1}) \frac{Pr(y_n | x_n, y_{1:n-1})}{Pr(y_n | x_n, y_{1:n-1})}$$

Equation (19) may be rearranged as follows:

$$Pr(x_n, z_n | y_{1:n}) = \quad (20)$$

$$Pr(x_n | y_{1:n-1}) \cdot Pr(y_n | x_n, y_{1:n-1}) \cdot \frac{Pr(y_n | x_n, z_n) \cdot Pr(z_n | x_n, y_{1:n-1})}{Pr(y_n | x_n, y_{1:n-1})}$$

Equation (20) may be rewritten using KF notation:

$$Pr(x_n, z_n | y_{1:n}) = Pr(x_n | y_{1:n-1}) \cdot Pr(y_n | x_n, y_{1:n-1}) \cdot \frac{KF}{Pr(z_n | x_n, y_n)} \quad (21)$$

For the predict stage of KF $KF(z_n | x_n, y_{1:n})$ and applying the law of total probability, the following derivation may be used:

$$Pr(z_n | x_n, y_{1:n-1}) = \int Pr(z_n, x_{n-1} | x_n, y_{1:n-1}) dx_{n-1} \quad (22)$$

Invoking the Base in Equation (22):

$$Pr(z_n | x_n, y_{1:n-1}) = \int Pr(z_n | x_{n-1}, x_n, y_{1:n-1}) \cdot Pr(x_{n-1} | x_n, y_{1:n-1}) dx_{n-1} \quad (23)$$

Understanding that $x_n$ is irrelevant to $z_n$ given $x_{n-1}$ and past measurements:

$$Pr(z_n | x_n, y_{1:n-1}) = \int Pr(z_n | x_{n-1}, y_{1:n-1}) \cdot Pr(x_{n-1} | x_n, y_{1:n-1}) dx_{n-1} \quad (24)$$

Utilizing Base twice in Equation (24):

$$Pr(z_n | x_n, y_{1:n-1}) = \int Pr(z_n | x_{n-1}, y_{1:n-1}) \cdot \frac{Pr(x_n | x_{n-1}, y_{1:n-1}) \cdot Pr(x_{n-1} | y_{1:n-1})}{Pr(x_n | y_{1:n-1})} dx_{n-1} \quad (25)$$

Re-arranging the Equation (25) provides:

$$Pr(z_n | x_n, y_{1:n-1}) = \frac{1}{Pr(x_n | y_{1:n-1})} \cdot \int Pr(z_n | x_{n-1}, y_{1:n-1}) \cdot Pr(x_n | x_{n-1}) \cdot Pr(x_{n-1} | y_{1:n-1}) dx_{n-1} \quad (26)$$

Realizing that past measurements are irrelevant to $x_n$ given $x_{n-1}$:

$$Pr(z_n | x_n, y_{1:n-1}) = \frac{1}{Pr(x_n | y_{1:n-1})} \cdot \quad (27)$$

$$\int Pr(z_n | x_{n-1}, y_{1:n-1}) \cdot Pr(x_n | x_{n-1}) \cdot Pr(x_{n-1} | y_{1:n-1}) dx_{n-1}$$

Re-arranging the equation:

$$Pr(z_n | x_n, y_{1:n-1}) = \frac{1}{Pr(x_n | y_{1:n-1})} \cdot \quad (28)$$

$$\int Pr(x_n | x_{n-1}) \cdot Pr(x_{n-1} | y_{1:n-1}) \cdot Pr(z_n | x_{n-1}, y_{1:n-1}) dx_{n-1}$$

Equation 28 can be converted to discrete domain $$Pr(z_n | x_n, y_{1:n-1}) = \frac{1}{\sum_{x_{n-1}} Pr(x_n | x_{n-1}) \cdot Pr(x_{n-1} | y_{1:n-1})} \cdot \quad (29)$$

$$\sum_{x_{n-1}} Pr(x_n | x_{n-1}) \cdot Pr(x_{n-1} | y_{1:n-1}) \cdot Pr(z_n | x_{n-1}, y_{1:n-1}) \cdot S_{cell}$$

The sum of weighted Gaussians may be approximated using a single Gaussian equation:

$$p_n = \frac{Pr(x_n | x_{n-1}) \cdot Pr(x_{n-1} | y_{1:n-1})}{\sum_{x_{n-1}} Pr(x_n | x_{n-1}) \cdot Pr(x_{n-1} | y_{1:n-1})} \quad (30)$$

And $Pr(z_n | x_{n-1}, y_{1:n-1})$ distribution is defined by $\eta_n, \sigma_n^2$ in Equation (30):

$$Pr(z_n | x_n, y_{1:n-1}) = \Sigma p_n \cdot N(\eta_n, \sigma_n^2) \quad (31)$$

The weighted Gaussian sum may be approximated by a single Gaussian equation as follows:

$$\eta = \sum_n p_n \cdot \eta_n \quad (32)$$

$$\sigma^2 = \sum_n p_n \cdot (\sigma_n^2 + \eta_n^2) - \eta^2 \quad (33)$$

Derivation of $Pr(y_n | x_n, y_{1:n-1})$—The derivation started with the following and derived the KF update as follows:

$$Pr(x_n, z_n | y_{1:n}) = Pr(y_n | x_n, y_{1:n-1}) \cdot Pr(x_n | y_{1:n-1}) \cdot Pr(z_n | x_n, y_{1:n}) \quad (34)$$

Utilizing the law of total probability in Equation (34):

$$Pr(y_n | x_n, y_{1:n-1}) = \int Pr(y_n, z_n | x_n, y_{1:n-1}) \cdot dz \quad (35)$$

Invoking Base:

$$Pr(y_n | x_n, y_{1:n-1}) = \int Pr(y_n | z_n, x_n, y_{1:n-1}) \cdot Pr(z_n | x_n, y_{1:n-1}) \cdot dz \quad (36)$$

Noting that previous measurements are irrelevant to $y_n$ given $x_n$ and $z_n$ $$Pr(y_n | x_n, y_{1:n-1}) = \int Pr(y_n | z_n, x_n) \cdot Pr(z_n | x_n, y_{1:n-1}) \cdot dz \quad (37)$$

Define: $\hat{z}_n^- = \text{Mean}\{z_n | x_n, y_{1:n-1}\}$ and approximate $z_n | x_n, y_{1:n-1}$ as a delta function (thin Gaussian):

$$Pr(y_n | x_n, y_{1:n-1}) = Pr(y_n | \hat{z}_n^-, x_n) \quad (38)$$

Recall that:

$$Pr(x_n, z_n | y_{1:n}) = Pr(y_n | x_n, \hat{z}_n^-) \cdot Pr(x_n | y_{1:n-1}) \cdot Pr(z_n | x_n, y_{1:n}) \quad (39)$$

Integrating over $z_n$ to receive wanted probability:

$$Pr(x_n|y_{1:n}) = \int Pr(x_n, z_n | y_{1:n}) dz_n = \int Pr(y_n | x_n, \hat{z}_n^-) \cdot$$
$$Pr(x_n | y_{1:n-1}) \cdot Pr(z_n | x_n, y_{1:n}) dz_n = Pr(y_n | x_n, \hat{z}_n^-) \cdot$$
$$Pr(x_n | y_{1:n-1}) \cdot \int Pr(z_n | x_n, y_{1:n}) dz_n \quad (40)$$

The final solution is:

$$Pr(x_n | y_{1:n}) = Pr(y_n | x_n, \hat{z}_n^-) \cdot Pr(x_n | y_{1:n-1}) \quad (41)$$

The following are non-limiting exemplary embodiments of different aspects of the disclosure. Example 1 is directed to a processor circuitry for determining the location of a mobile device in an enclosed area, the processor circuitry programmed with logic to implement functions, comprising: identifying a plurality of locations (Xn, Yn) in the area and assigning each location an initial Bayesian Filter (BF) probability value (Pr) for presence of the mobile device; assigning an initial Kalman filter (KF) probability value for presence of the mobile device; determining the probability that the mobile device is at a first location $Pr(X_n/Y_{n-1})$ by summing the probabilities that the mobile device is located at a neighboring location and multiplying the summed probabilities by a transition probability; determining a weight value Pn as a function of the probability that the mobile device is at the first location $Pr(X_n/Y_{n-1})$ and the transition probability; calculating a mean value and a variance value as a function of the weight value Pn for a respective location; calculating an updated KF value as a function of a bias value, the mean value and the variance value; and calculating an updated BF value as a function of the bias value; and updating the location of the mobile device as a function of the updated BF and the updated KF values.

Example 2 is directed to the processor circuitry of example 1, wherein the processor circuitry is further programmed with logic to implement functions such that each of the plurality of neighboring locations comprises a hexagonal cell.

Example 3 is directed to the processor circuitry of example 2, wherein the processor circuitry is further programmed with logic in which assigning an initial KF filter probability value further comprises assigning an initial bias value that the mobile device is located at each of the plurality of hexagonal cells.

Example 4 is directed to the processor circuitry of example 2, wherein the processor circuitry is further programmed with logic in which assigning an initial BF probability value further comprises, for each hexagonal cell, identifying neighboring hexagonal cells ($X_{n-1}$) and multiplying the probability that the mobile device is present at each neighboring hexagonal cell ($X_{n-1}$) by the transition probability.

Example 5 is directed to the processor circuitry of example 1, wherein the processor circuitry is further programmed with logic in which summing the probabilities that the mobile device is located at neighboring locations is determined by the following Equation:

$$Pr(x_n | y_{1:n-1}) = \sum_{x_{n-1}} Pr(x_n | x_{n-1}) \cdot Pr(x_{n-1} | y_{1:n-1})$$

Example 6 is directed to the processor circuitry of example 2, wherein the processor circuitry is further programmed with logic which further comprises assigning an initial KF probability value of 1 for each of the plurality of hexagonal cells.

Example 7 is directed to the processor circuitry of example 2, wherein the transition probability is determined as a function of the distance between adjacent hexagonal cells.

Example 8 is directed to the processor circuitry of example 1, the processor circuitry is further programmed with logic in which determining the probability that the mobile device is at the first location $Pr(X_n/Y_{n-1})$ further comprises summing the probabilities that the mobile device is located at all neighboring locations and multiplying the summed probabilities by a transition probability.

Example 9 is directed to a processor circuitry programmed with logic to implement functions, comprising: receiving time-of-flight information (ToF) for communications between one or more Access Points (APs) and a mobile device; identifying a first group of state variables having a Gaussian noise distribution and applying a Kalman filter (KF) to determine probability of error in a ToF location determination as a function of the first group of state variables; identifying a second group of state variables having a non-Gaussian noise distribution and applying a Bayesian filter (BF) to determine probability of error in the ToF location determination as function of the second group of state variables; approximating the location of the mobile device at least partly by combining the probabilities of error determined using the KF and the BF.

Example 10 is directed to the processor circuitry of example 9, wherein the logic further comprises functions for subdividing a region about the mobile device into a plurality of hexagonal cells.

Example 11 is directed to the processor circuitry of example 10, wherein applying the KF to determine probability of error further comprises assigning an initial KF probability value for presence of the mobile device at each of the plurality of hexagonal cells.

Example 12 is directed to the processor circuitry of example 11, where in the logic further comprises functions for calculating an updated KF value as a function of a bias value, a mean value and a variance value in relation to the mobile device location probability at each of the plurality of the hexagonal cells.

Example 13 is directed to the processor circuitry of example 10, wherein the logic further comprises functions for applying the BF filter to determine probability of error further comprises assigning each of the plurality of hexagonal cells an initial BF probability value (Pr) indicating probability of the mobile device presence at each respective cell.

Example 14 is directed to the processor circuitry of example 13, wherein the logic further comprises functions for calculating an updated BF value as a function of a bias value associated with the mobile device's presence at each of the plurality of hexagonal cells.

Example 15 is directed to a method for determining the location of a mobile device in an enclosed area, comprising: identifying a plurality of locations (Xn, Yn) in the area and assigning each location an initial Bayesian Filter (BF) probability value (Pr) for presence of the mobile device; assigning an initial Kalman filter (KF) probability value for presence of the mobile device; determining the probability that the mobile device is at a first location $Pr(X_n/Y_{n-1})$ by summing the probabilities that the mobile device is located at neighboring locations and multiplying the summed probabilities by a transition probability; determining a weight value Pn as a function of the probability that the mobile device is at the first location $Pr(X_n/Y_{n-1})$ and the transition probability; calculating a mean value and a variance value as a function of the weight value Pn for a respective location; calculating an updated KF value as a function of a bias value, the mean value and the variance value; and calculating an updated BF value as a function of the bias value; and updating the location of the mobile device as a function of the updated BF and the updated KF values.

Example 16 is directed to the method of example 15, wherein each of the plurality of neighboring locations comprises a hexagonal cell.

Example 17 is directed to the method of example 16, wherein assigning an initial KF filter probability value further comprises assigning an initial bias value that the mobile device is located at each of the plurality of hexagonal cells.

Example 18 is directed to the method of example 16, wherein assigning an initial BF probability value further comprises, for each hexagonal cell, identifying all neighboring hexagonal cells ($X_{n-1}$) and multiplying the probability that the mobile device is present at each neighboring hexagonal cell ($X_{n-1}$) by the transition probability.

Example 19 is directed to the method of example 15, wherein summing the probabilities that the mobile device is located at all neighboring locations is determined by the following Equation:

$$Pr(x_n | y_{1:n-1}) = \sum_{x_{n-1}} Pr(x_n | x_{n-1}) \cdot Pr(x_{n-1} | y_{1:n-1})$$

Example 20 is directed to the method of example 16, further comprising assigning an initial KF probability value of 1 for each of the plurality of hexagonal cells.

Example 21 is directed to the method of example 16, wherein the transition probability is determined as a function of the distance between adjacent hexagonal cells.

Example 22 is directed to the method of example 15, wherein determining the probability that the mobile device is at the first location $Pr(X_n/Y_{n-1})$ further comprises summing the probabilities that the mobile device is located at all neighboring locations and multiplying the summed probabilities by a transition probability.

While the principles of the disclosure have been illustrated in relation to the exemplary embodiments shown herein, the principles of the disclosure are not limited thereto and include any modification, variation or permutation thereof.

What is claimed is:

1. Processor circuitry for determining the location of a mobile device in an enclosed area, the processor circuitry programmed with logic to implement functions, comprising:
    identifying a plurality of locations (Xn, Yn) in the area and assigning each location an initial Bayesian Filter (BF) probability value (Pr) for presence of the mobile device;
    assigning an initial Kalman filter (KF) probability value for presence of the mobile device;
    determining the probability that the mobile device is at a first location $Pr(X_n/Y_{n-1})$ by summing the probabilities that the mobile device is located at a neighboring location and multiplying the summed probabilities by a transition probability;
    determining a weight value Pn as a function of the probability that the mobile device is at the first location $Pr(X_n/Y_{n-1})$ and the transition probability;
    calculating a mean value and a variance value as a function of the weight value Pn for a respective location;
    calculating an updated KF value as a function of a bias value, the mean value and the variance value; and
    calculating an updated BF value as a function of the bias value; and
    updating the location of the mobile device as a function of the updated BF and the updated KF values.

2. The processor circuitry of claim 1, wherein the processor circuitry is further programmed with logic to implement functions such that each of the plurality of neighboring locations comprises a hexagonal cell.

3. The processor circuitry of claim 2, wherein the processor circuitry is further programmed with logic in which assigning an initial KF filter probability value further comprises assigning an initial bias value that the mobile device is located at each of the plurality of hexagonal cells.

4. The processor circuitry of claim 2, wherein the processor circuitry is further programmed with logic in which assigning an initial BF probability value further comprises, for each hexagonal cell, identifying neighboring hexagonal cells ($X_{n-1}$) and multiplying the probability that the mobile device is present at each neighboring hexagonal cell ($X_{n-1}$) by the transition probability.

5. The processor circuitry of claim 1, wherein the processor circuitry is further programmed with logic in which summing the probabilities that the mobile device is located at neighboring locations is determined by the following Equation:

$$Pr(x_n | y_{1:n-1}) = \sum_{x_{n-1}} Pr(x_n | x_{n-1}) \cdot Pr(x_{n-1} | y_{1:n-1}).$$

6. The processor circuitry of claim 2, wherein the processor circuitry is further programmed with logic which further comprises assigning an initial KF probability value of 1 for each of the plurality of hexagonal cells.

7. The processor circuitry of claim 2, wherein the transition probability is determined as a function of the distance between adjacent hexagonal cells.

8. The processor circuitry of claim 1, the processor circuitry is further programmed with logic in which determining the probability that the mobile device is at the first location $Pr(X_n/Y_{n-1})$ further comprises summing the probabilities that the mobile device is located at all neighboring locations and multiplying the summed probabilities by a transition probability.

9. A method for determining the location of a mobile device in an enclosed area, comprising:
    identifying a plurality of locations (Xn, Yn) in the area and assigning each location an initial Bayesian Filter (BF) probability value (Pr) for presence of the mobile device;
    assigning an initial Kalman filter (KF) probability value for presence of the mobile
    determining the probability that the mobile device is at a first location $Pr(X_n/Y_{n-1})$ by summing the probabilities that the mobile device is located at neighboring locations and multiplying the summed probabilities by a transition probability;
    determining a weight value Pn as a function of the probability that the mobile device is at the first location $Pr(X_n/Y_{n-1})$ and the transition probability;

calculating a mean value and a variance value as a function of the weight value Pn for a respective location;

calculating an updated KF value as a function of a bias value, the mean value and the variance value;

calculating an updated BF value as a function of the bias value; and updating the location of the mobile device as a function of the updated BF and the updated KF values.

10. The method of claim 9, wherein each of the plurality of neighboring locations comprises a hexagonal cell.

11. The method of claim 10, wherein assigning an initial KF filter probability value further comprises assigning an initial bias value that the mobile device is located at each of the plurality of hexagonal cells.

12. The method of claim 10, wherein assigning an initial BF probability value further comprises, for each hexagonal cell, identifying all neighboring hexagonal cells ($X_{n-1}$) and multiplying the probability that the mobile device is present at each neighboring hexagonal cell ($X_{n-1}$) by the transition probability.

13. The method of claim 9, wherein summing the probabilities that the mobile device is located at all neighboring locations is determined by the following Equation:

$$Pr(x_n \mid y_{1:n-1}) = \sum_{x_{n-1}} Pr(x_n \mid x_{n-1}) \cdot Pr(x_{n-1} \mid y_{1:n-1}).$$

14. The method of claim 10, further comprising assigning an initial KF probability value of 1 for each of the plurality of hexagonal cells.

15. The method of claim 10, wherein the transition probability is determined as a function of the distance between adjacent hexagonal cells.

16. The method of claim 9, wherein determining the probability that the mobile device is at the first location $Pr(X_n/Y_{n-1})$ further comprises summing the probabilities that the mobile device is located at all neighboring locations and multiplying the summed probabilities by a transition probability.

* * * * *